(12) United States Patent
Taniguchi (10) Patent No.: US 10,118,214 B2
(45) Date of Patent: Nov. 6, 2018

(54) THREAD-ROLLING FLAT DIE FOR THREADED FASTENER, AND THREAD-ROLLING METHOD

(71) Applicant: Sanshu Co., Ltd., Kasugai-shi (JP)

(72) Inventor: Masaki Taniguchi, Kasugai (JP)

(73) Assignee: SANSHU CO., LTD., Kasugai-Shi (JP)

( * ) Notice: Subject to any disclaimer, the term of this patent is extended or adjusted under 35 U.S.C. 154(b) by 0 days.

(21) Appl. No.: 15/567,968

(22) PCT Filed: Apr. 27, 2016

(86) PCT No.: PCT/JP2016/063159
§ 371 (c)(1),
(2) Date: Oct. 20, 2017

(87) PCT Pub. No.: WO2017/158853
PCT Pub. Date: Sep. 21, 2017

(65) Prior Publication Data
US 2018/0117664 A1 May 3, 2018

(30) Foreign Application Priority Data

Mar. 18, 2016 (JP) .................................. 2016-056233

(51) Int. Cl.
*B21H 3/06* (2006.01)
*B21H 3/02* (2006.01)
*B23G 7/02* (2006.01)

(52) U.S. Cl.
CPC ................ *B21H 3/06* (2013.01); *B21H 3/02* (2013.01); *B23G 7/02* (2013.01)

(58) Field of Classification Search
CPC . B21H 3/02; B21H 3/022; B21H 3/06; B21H 3/065; B23G 7/00; B23G 7/02
See application file for complete search history.

(56) References Cited

U.S. PATENT DOCUMENTS

| 4,862,718 A * | 9/1989 | LaCroix ................. B21H 3/06 72/469 |
| 5,182,937 A | 2/1993 | Dickson |

(Continued)

FOREIGN PATENT DOCUMENTS

| JP | 03-086343 | 4/1991 |
| JP | 5-245573 | 9/1993 |

(Continued)

OTHER PUBLICATIONS

Japanese Office Action for corresponding JP Application No. 2016-056233, May 2, 2016 (w/ machine translation).

(Continued)

*Primary Examiner* — Pradeep C Battula
(74) *Attorney, Agent, or Firm* — Mori & Ward, LLP (57) ABSTRACT

A thread-rolling flat die for a threaded fastener, includes a thread-rolling surface including at least a bite surface to which a workpiece of the threaded fastener is supplied, a finishing surface formed adjacent to the bite surface, and a roll-off surface formed adjacent to the finishing surface. The bite surface includes at least: a first partial bite surface having an inclination and a second partial bite surface formed continuously from the first partial bite surface and having an inclination. A length L1 along a thread-rolling direction in the first partial bite surface, a length L3 along the thread-rolling direction in the finishing surface, a length L4 along the thread-rolling direction in the roll-off surface, and a diameter of a processed portion of the workpiece of the threaded fastener have a relationship of L1>L3>L4> the diameter of the processed portion.

4 Claims, 8 Drawing Sheets

(56) References Cited

U.S. PATENT DOCUMENTS 5,243,843 A 9/1993 Dickson
2002/0043094 A1 4/2002 Murai et al.
2005/0217345 A1 10/2005 Taniguchi et al.

FOREIGN PATENT DOCUMENTS

JP 2002-192282 7/2002
JP 2005-288456 10/2005

OTHER PUBLICATIONS

International Search Report for corresponding International Application No. PCT/JP2016/063159, dated Jul. 26, 2016.
Written Opinion for corresponding International Application No. PCT/JP2016/063159, dated Jul. 26, 2016.

* cited by examiner

THREAD-ROLLING FLAT DIE FOR THREADED FASTENER, AND THREAD-ROLLING METHOD

TECHNICAL FIELD

The present invention relates to a thread-rolling flat die for threaded fasteners which produces the threaded fasteners as external threads, and a thread rolling method using the die.

BACKGROUND ART

For example, the Patent Document 1 discloses a rolling die for producing external threads such as bolts or male screws made of the material having a high degree of hardness through a rolling process.

Specifically, there is shown a rolling die having a bite portion in which processing teeth at a starting point in the bite portion have a lower tooth height, a larger tooth tip angle, and a larger trough angle between the processing teeth at the starting point than processing teeth in a finishing portion. In the rolling die described above, since the processing teeth at the starting point in the bite portion are shallow and have an obtuse angle for the initial bite at a workpiece or blank, cracking or localized breakage becomes less likely to occur near the tooth tip at the bite portion that includes the starting point, and a longer life of the rolling die can be allowed.

Recently, an effort is underway to reduce the weight of products such as automobiles, and there is increasing demand for heat-treated bolts having a high degree of hardness to be used in such products.

PRIOR ART DOCUMENT

Patent Document

[Patent Document 1] Japanese Patent Application Publication No. 2005-288456

SUMMARY OF THE INVENTION

Problem to be Solved by the Invention

However, when the bolts having the high degree of hardness are produced with the conventional dies, defects may occur at an early stage of the process such that chipping (or cracking) occurs on the die or the processing teeth thereof are deformed. As a result, a problem arises such that the life of the die may be significantly shortened.

Thus, the inventors continued to make efforts and attained success in developing of the thread-rolling flat die for a threaded fastener that can reduce the production cost of the die itself and has a longer life so as to be usable for a long period even when the workpiece or blank with a high degree of hardness is subjected to the thread-rolling process, and the thread-rolling method using the thread-rolling flat die for a threaded fastener.

The object of the present invention is to provide a thread-rolling flat die for a threaded fastener that can reduce the production cost of the die itself and has a longer life, and a thread-rolling method using the thread-rolling flat die for a threaded fastener.

Means for Solving the Problem

The present invention is directed to a thread-rolling flat die for a threaded fastener, comprising a thread-rolling surface including at least a bite surface to which a workpiece or blank of the threaded fastener is supplied, and a finishing surface formed adjacent to the bite surface, wherein the bite surface includes at least: a first partial bite surface having an inclination receding with distance from the finishing surface and an angle $\alpha$ of the inclination with respect to the finishing surface; and a second partial bite surface continuously formed between the first partial bite surface and the finishing surface and having an inclination receding with distance from the finishing surface and an angle $\beta$ of the inclination with respect to the finishing surface, the angle $\beta$ being smaller than the angle $\alpha$;

wherein, in the first partial bite surface and the second partial bite surface, a crest angle of a processing tooth for forming a trough bottom of the thread groove in the threaded fastener is larger than a crest angle of a processing tooth in the finishing surface, and wherein a crest shape of the processing tooth gradually changes from a root side to the crest angle of the processing tooth in the finishing surface along the thread-rolling surface from a starting point of the first partial bite surface toward the finishing surface.

In the first partial bite surface of such a structure described above which has the inclination with a relatively large angle, the so-called bite speed is relatively high in the processing process, and thus loads are prone to be applied to the die. On the other hand, for a period which the workpiece is positioned in the first partial bite surface, this workpiece is to be processed with the processing teeth having larger crest angles than the crest angles of the processing teeth in the finishing surface. Thus, the displacement of the material is relatively small. Consequently, since the bite speed is relatively high, but the displacement of the material is relatively small, the excess loads applied to the die can be suppressed.

In addition, the present invention has the second partial bite surface in which the crest angle of the processing tooth is the same as that in the first partial bite surface, but the inclination angle with respect to the finishing surface is relatively small. By adoption of the structure described above, the so-called bite speed becomes relatively low in the process that the displacement of the material increases progressively as the crest shape of the processing tooth approaches the final shape. Therefore, sufficient displacement of the material can be secured, loads applied to the dies can be reduced, and the workpiece can smoothly be introduced to the finishing surface.

When the angle $\alpha$ of the inclination in the first partial bite surface and the angle $\beta$ of the inclination in the second partial bite surface has the relationship of $\alpha<\beta$, for example, the displacement of the material in the second partial bite surface increases, and the so-called bite speed also increases. As a result, the loads applied to the dies abruptly increase in the second partial bite surface or at the boundary portion between the second partial bite surface and the finishing surface, and the chipping is prone to occur in the portion described above.

Here, it is preferable that a length L1 along a thread-rolling direction in the first partial bite surface, a length L2 along a thread-rolling direction in the second partial bite surface, and a length L3 along a thread-rolling direction in the finishing surface have a relationship of L2>L1>L3.

In such a structure described above, the inventors found through their analysis that the region where the friction between the workpiece and the thread-rolling surface becomes maximum and the maximum load is applied to the die is a region immediately in front of the finishing surface. Thus, the present invention is designed to set the length L2 in the second partial bite surface corresponding to the region described above as long as possible so as to maximize the processing region in the second partial bite surface. Then, the length L1 in the first partial bite surface is determined, and finally, the finishing surface is configured with the length shorter than the length L1. This allows the thread-rolling that can effectively suppress or control the load applied to the die within the limited overall length of the die.

In addition, preferably, the inclination of the first partial bite surface is constituted with the length along the thread-rolling direction in the first partial bite surface and a backward amount in the first partial bite surface with respect to the finishing surface, the inclination of the second partial bite surface is constituted with the length along the thread-rolling direction in the second partial bite surface and a backward amount with respect to the finishing surface, and the inclination of the second partial bite surface is constituted with at least 40% or less of the backward amount relative to a sum of the backward amount in the first partial bite surface and the backward amount in the second partial bite surface.

With such a configuration, it can be avoided that the loads applied to the dies abruptly increase in the second partial bite surface or at the boundary portion between the second partial bite surface and the finishing surface, thereby causing any chipping in the portion described above.

The present invention is also directed to the thread-rolling method using the thread-rolling flat die for a threaded fastener disclosed above, wherein a die on a moving side of the thread-rolling flat die for a threaded fastener moves at a constant speed during a period that the workpiece moves from the first partial bite surface to the finishing surface.

With such a configuration, high volume production becomes possible in a simplified and stable manner without special processes such as changing the moving speed of the thread-rolling flat die during the thread-rolling process.

Effect of the Invention

In the thread-rolling flat die for a threaded fastener according to the present invention, the occurrence of chipping associated with the workpiece having its high degree of hardness can be suppressed. Therefore, the present invention can ensure the longer life of the die.

In addition, the thread-rolling method according to the present invention allows the high volume production of the threaded fasteners in the simplified and stable manner.

MODE FOR CARRYING OUT THE INVENTION

Hereinafter, preferred embodiments will be described in detail for embodying the thread-rolling flat die for a threaded fastener (hereinafter referred to as a "thread-rolling flat die") and the thread rolling method using the thread-rolling flat die in accordance with the present invention. The present invention is not limited by the embodiments described below, and the modification or alteration of the design can be made appropriately. For the sake of a clear description, the figures are not drawn to scale; however, this is not to be construed as limiting the present invention.

Figure 1:
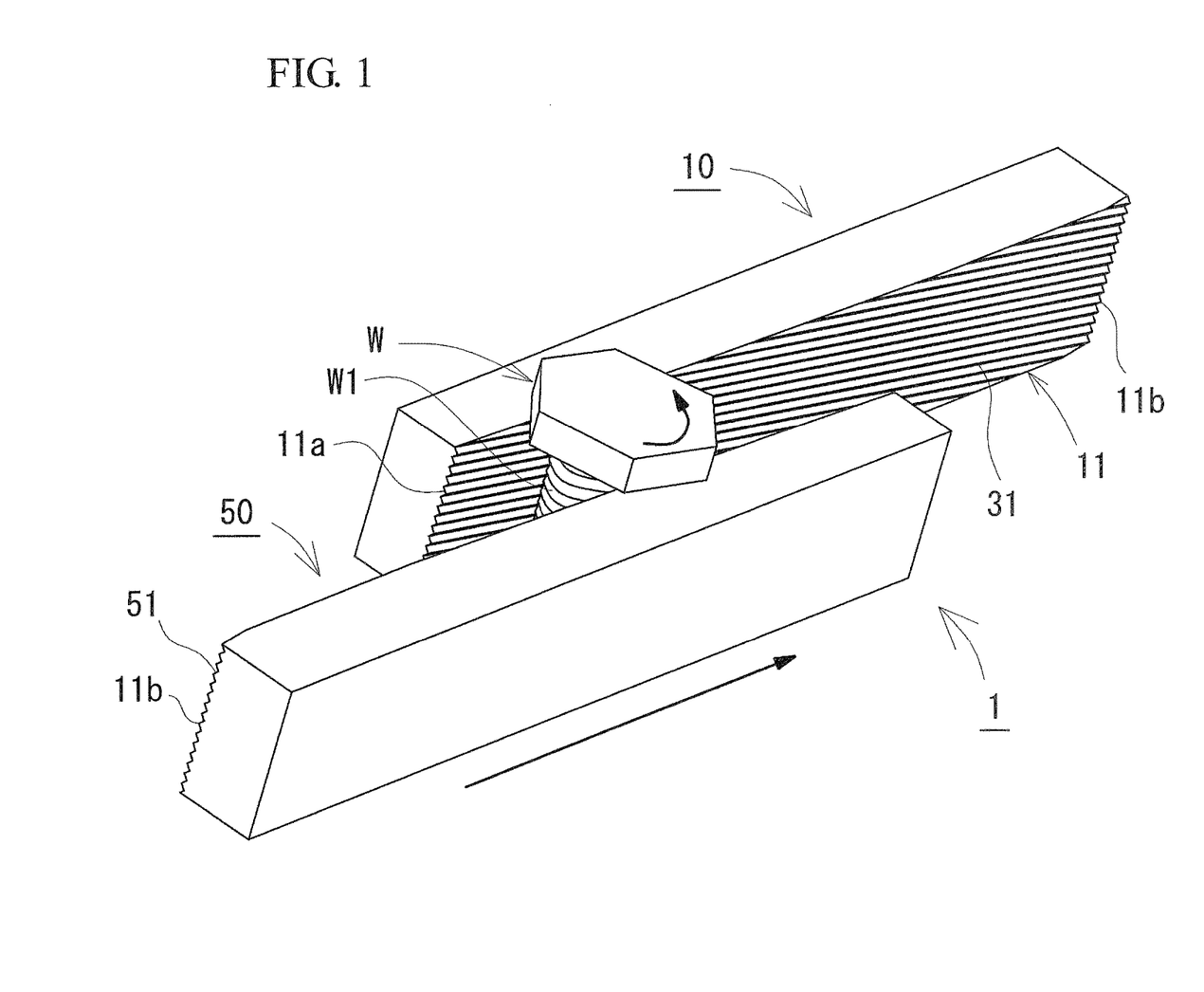
FIG. 1 is a schematic diagram, showing usage state of the thread-rolling flat die for a threaded fastener.

As shown in FIG. 1, the thread-rolling flat die 1 is constructed with a stationary side die 10 having a generally cuboid shape which is secured on a designated base, and a moving side die 50 for moving along a predetermined direction with respect to the stationary side die 10.

More specifically, the stationary side die 10 has a stationary side thread-rolling surface 11, whereas the moving side die 50 has a moving side thread-rolling surface 51. The stationary side thread-rolling surface 11 and the moving side thread-rolling surface 51 are arranged to face each other, and the workpiece W interposed between the stationary side thread-rolling surface 11 and the moving side thread-rolling surface 51 is subjected to the rolling process to produce a bolt B. Incidentally, the moving direction of the moving side die 50 is in parallel with the stationary side thread-rolling surface 11 of the stationary side die 10 and consistent with the rolling direction.

Figure 2A:
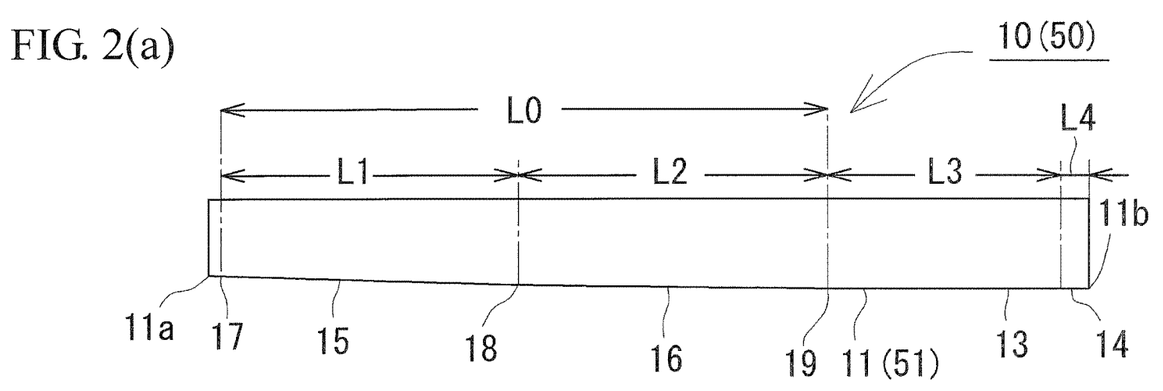
FIG. 2(a) is a plan view of the thread-rolling flat die for a threaded fastener.
Figure 2B:
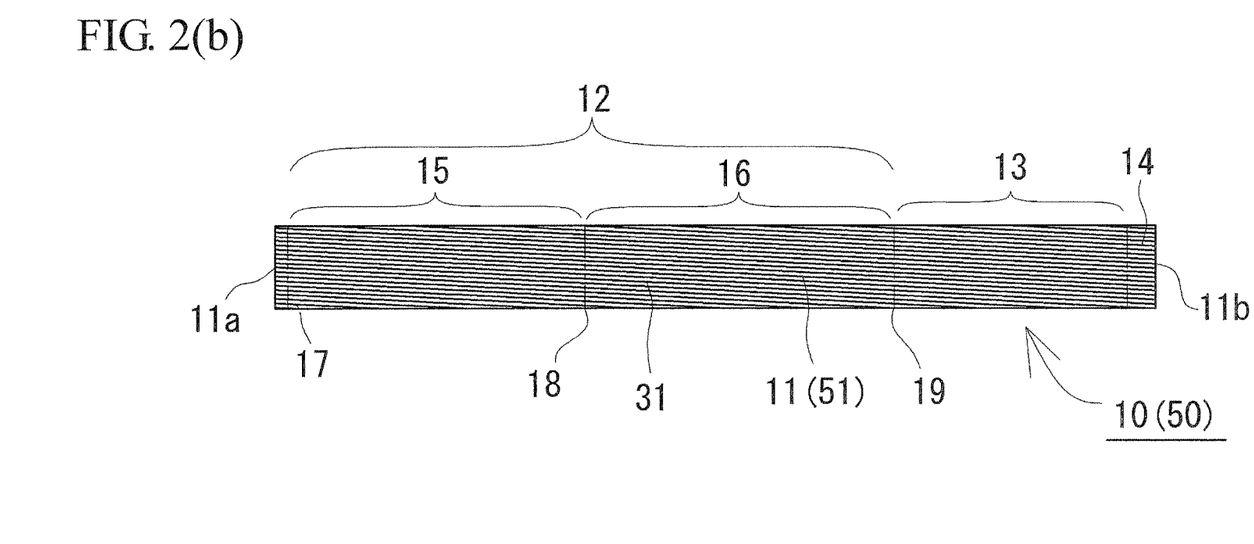
FIG. 2(b) is a front view of the thread-rolling flat die for a threaded fastener.

Specifically, as shown in FIG. 2(a) and FIG. 2(b), the dimensions of respective dies 10, 50 are 60 mm in height, 400 mm in width, and 38.4 mm-38 mm in depth. Each of the dies 10, 50 is formed of cold die steel and into the shape described above.

The workpiece W of the bolt B uses a hard raw material such as chrome molybdenum steel that is heat-treated to reduce the weight. In addition, the bolt B which is a threaded fastener (product) is a hex screw having the size of M6×1.0 16R.

Each thread-rolling surface 11, 51 is provided with a plurality of processing teeth 31 for forming a processed portion W1 of the workpiece W into a threaded shape. The processed portion W1 of the workpiece W is subjected to plastic deformation with the processing teeth 31 to form the threaded portion of the bolt B, while the workpiece W rotates in the direction indicated by an arrow of FIG. 1. More specifically, the processing teeth 31 form the bottom of the trough in the thread groove of the bolt B as described below.

In this embodiment, pitch of the processing teeth 31 throughout each thread-rolling surface 11, 51 is set to the value equal to the pitch of the thread on the bolt B.

Incidentally, the stationary side die 10 and the moving side die 50 in this embodiment have the identical shape with each other, and the respective thread-rolling surfaces 11, 51 are symmetric with respect to a point. Therefore, the thread-rolling surfaces 11, 51 are hereinafter described in detail with the same reference numerals.

As shown in FIG. 2(b), the thread-rolling surface 11, 51 of the die 10, 50 in the thread-rolling flat die 1 has a bite surface 12. Also, a finishing surface 13 is provided adjacent to this bite surface 12. Yet, a roll-off surface 14 is provided adjacent to the finishing surface 13.

In the bite surface 12 described above, a thread-rolling starting point 17 is defined where the workpiece W is supplied. The length L0 is determined along the rolling direction from one end 11a to the other end 11b of the die 10, 50 with reference to the thread-rolling starting point 17. The length L0 is set as L0=295 mm. The bite surface 12 has the inclination which recedes with distance from the finishing surface 13. Such an inclination constitutes an essential portion of the present invention, and will be described in detail below.

In addition, the length L3 along the rolling direction in the finishing surface 12 is set as L3=92 mm.

The length L4 along the rolling direction in the roll-off surface 14 is set as L4=13 mm. The roll-off surface 14 has an inclination with respect to the finishing surface 13 in which the thread-rolling surfaces 11, 51 are spaced apart from each other with distance from the finishing surface 13. Specifically, the angle γ of the inclination is determined as γ=2.64° (0.6 mm/13 mm).

The details of the bite surface 12 will be described next.

Figure 3:
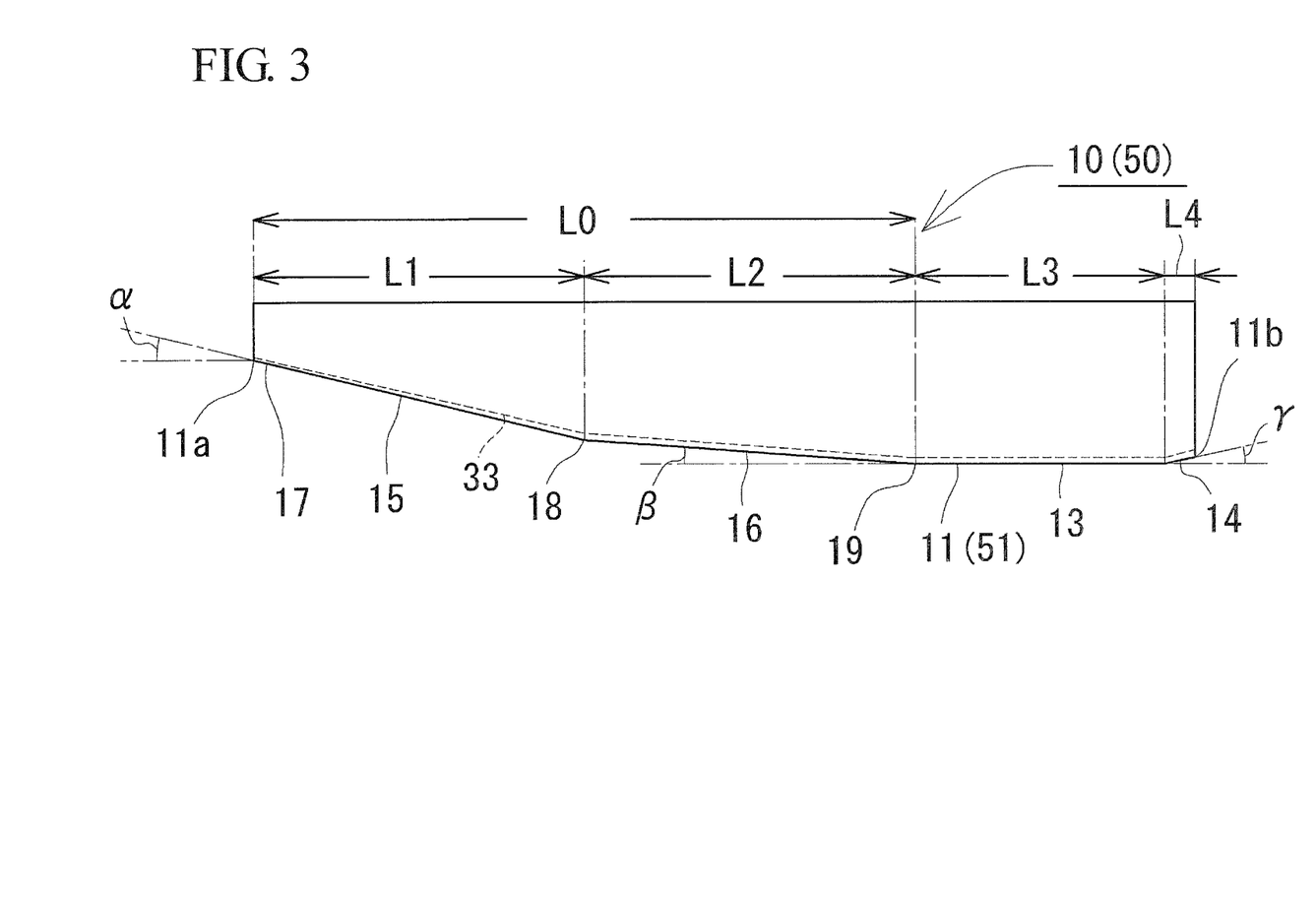
FIG. 3 is a schematic plan view, showing the thread-rolling flat die for a threaded fastener.

As shown in FIG. 3, the bite surface 12 is provided with at least a first partial bite surface 15 and a second partial bite surface 16 continuously formed between the first partial bite surface 15 and the finishing surface 13.

The first partial bite surface 15 has the length L1 along the rolling direction which is set as L1 =150 mm. The first partial bite surface 15 also has the inclination with the angle α=0.0955° (0.25/150) with respect to the finishing surface 13. In other words, a backward amount of the first partial bite surface 15 that recedes relative to the length L1 (150 mm) is set to be 0.25 mm.

On the other hand, the second partial bite surface 16 has the length L2 along the rolling direction which is set as L2 =145 mm. The second partial bite surface 16 also has the inclination with the angle β=0.0277° (0.07/145) with respect to the finishing surface 13. In other words, the backward amount of the second partial bite surface 16 that recedes relative to the length L2 (145 mm) is set to be 0.07 mm.

That is to say, it is preferable that the angle α of the first partial bite surface 15 and the angle β of the second partial bite surface 16 is α>β. The inclination of the first partial bite surface 15 is preferably at least 60% or more of the backward amount (mm) of the first partial bite surface 15 relative to the sum of the backward amount (mm) of the first partial bite surface 15 and the backward amount (mm) of the second partial bite surface 16. In addition, the inclination of the second partial bite surface 16 is preferably at least 40% or less of the backward amount (mm) of the second partial bite surface 16 relative to the sum of the backward amount (mm) of the first partial bite surface 15 and the backward amount (mm) of the second partial bite surface 16.

More preferably, the lengths L1, L2, and L3 described above have the relationship of L2>L1>L3. For example, it can be set such that L1=130 mm, L2=165 mm, and L3=92 mm.

The respective processing teeth 31 of the first partial bite surface 15 and second partial bite surface 16 will be described next.

Figure 4:
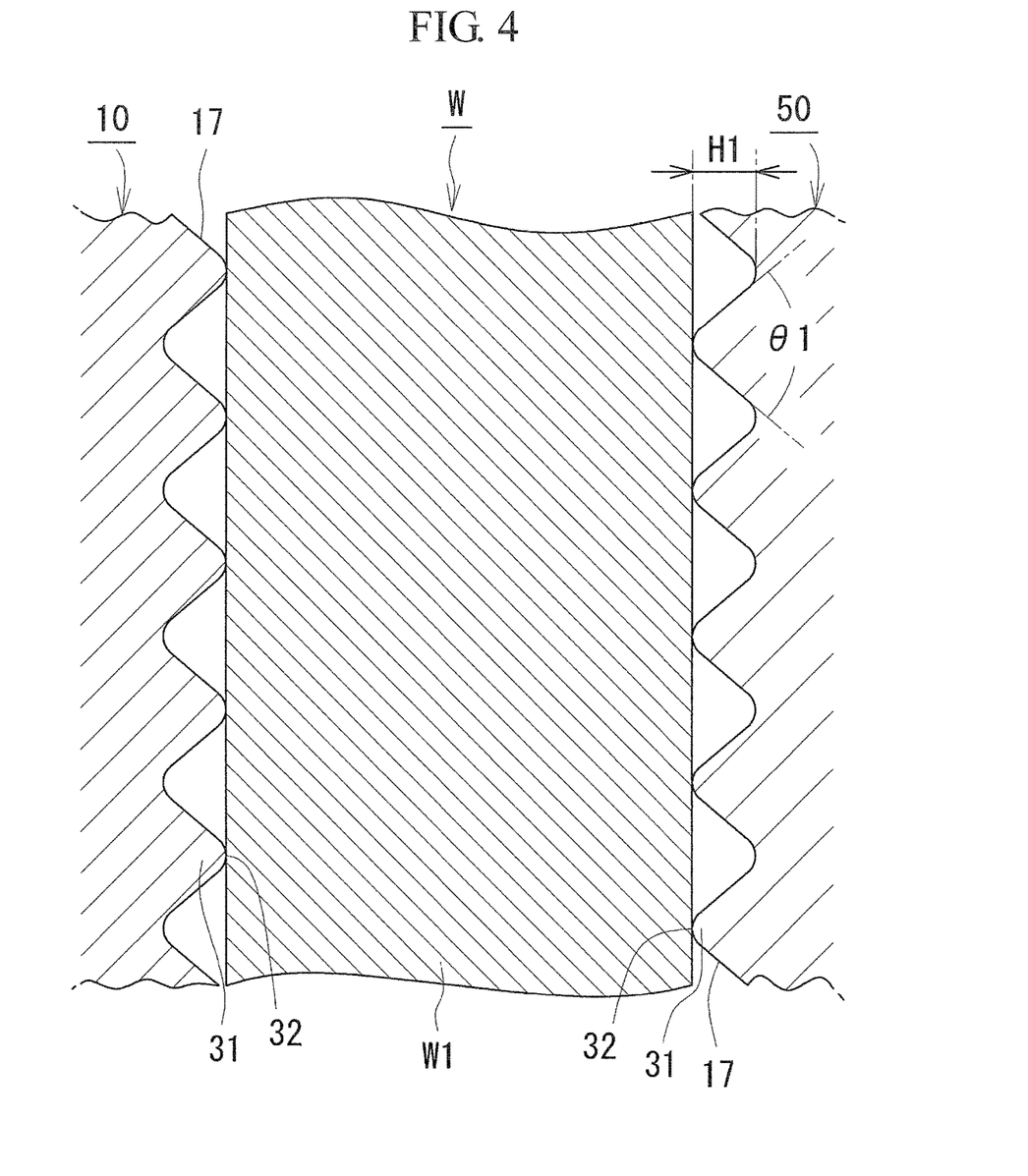
FIG. 4 is a partially enlarged vertical sectional view, showing the thread-rolling flat die for a threaded fastener and the workpiece at the thread-rolling starting point during the processing.
Figure 7A:
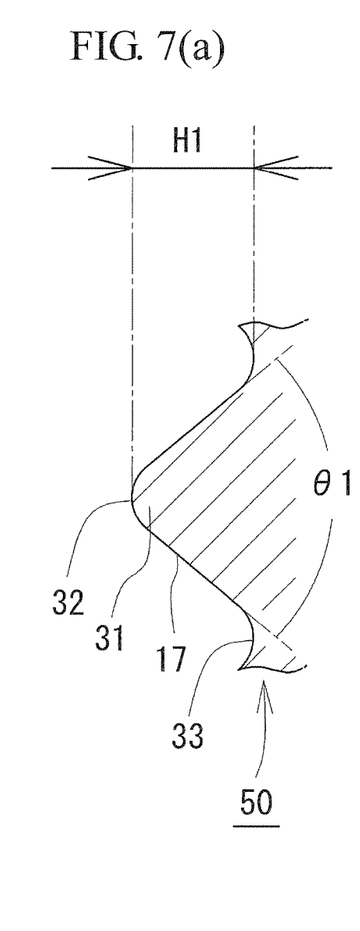
FIG. 7(a) is a vertical sectional view of the processing teeth, showing the thread-rolling starting point.

In the first partial bite surface 15, the thread-rolling starting point 17 is defined at a 5 mm position separated from one end 11a of the die 10, 50. The processing tooth 31 at the thread-rolling starting point 17 has a crest angle θ1, which is set as θ1=80°, as shown in FIG. 4 and FIG. 7(a).

Figure 5:
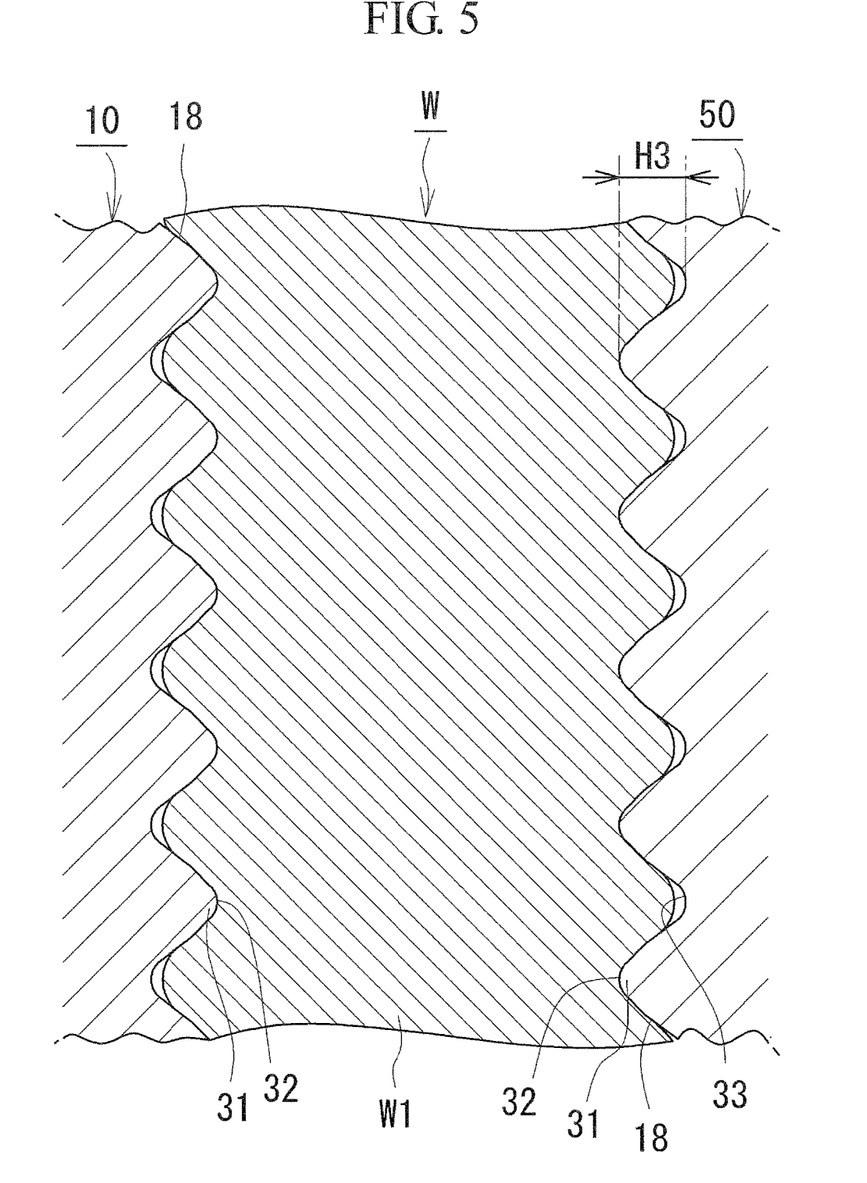
FIG. 5 is a partially enlarged vertical sectional view, showing the thread-rolling flat die for a threaded fastener and the workpiece at a first boundary portion during the processing.
Figures 7B, 7C:
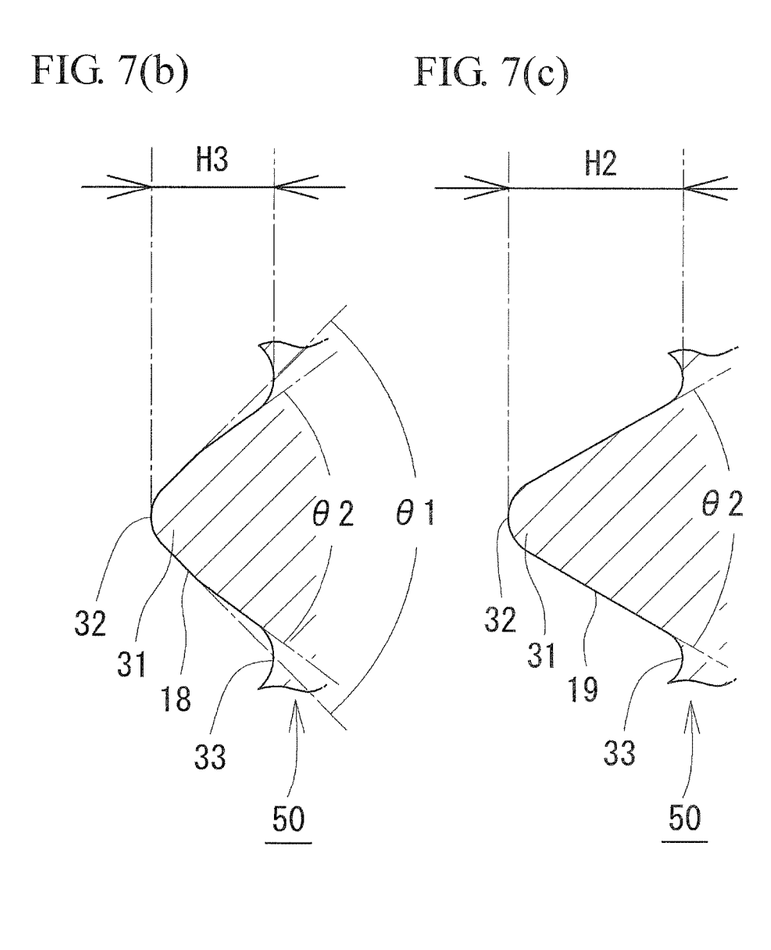
FIG. 7(b) is a vertical sectional view of the processing teeth, showing the first boundary portion.
FIG. 7(c) is a vertical sectional view of the processing teeth, showing the second boundary portion.

Additionally, as shown in FIG. 5 and FIG. 7(b), the processing tooth 31 at a boundary portion between the first partial bite surface 15 and the second partial bite surface 16 has the crest angle θ1, which is determined as θ1=80°. The crest shape of the processing tooth 31 gradually changes from the root side to the crest angle (60°) of the processing tooth 31 in the finishing surface 13.

Figure 6:
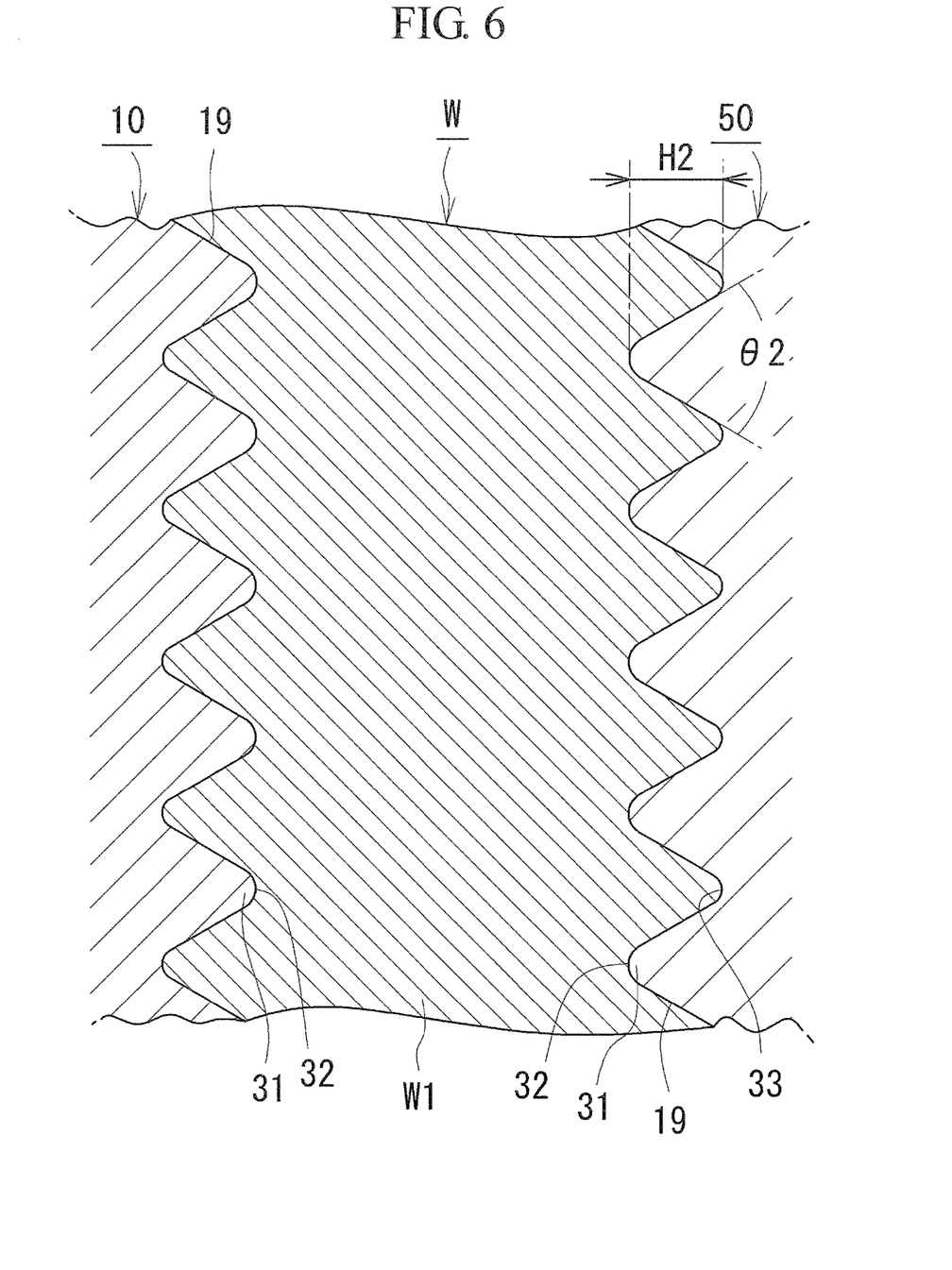
FIG. 6 is a partially enlarged vertical sectional view, showing the thread-rolling flat die for a threaded fastener and the workpiece at a second boundary portion during the processing.

On the other hand, as shown in FIG. 6 and FIG. 7(c), the crest angle θ2 of the processing tooth 31 in the finishing surface 13 is determined as θ2=60°.

The height H of the processing teeth 31 (distances between the trough bottom 33 and the crest 32 of the processing teeth 31) includes a height H1 of the processing tooth 31 in the first partial bite surface 15, a height H3 of the processing tooth 31 in the second partial bite surface 16, and a height H2 of the processing tooth 31 in the finishing surface 13, which have the relationship of H1<H3<H2.

The shape of the processing teeth 31 in the finishing surface 13 and the roll-off surface 14 described above has no shape variation within its range and corresponds to the shape of the thread groove in the bolt B.

The processing process of the workpiece W will be hereinafter described in detail.

First, as shown in FIG. 4, when the workpiece W is located at the thread-rolling starting point 17, the processed portion W1 of the workpiece W has not started its plastic deformation.

When the moving side die 50 starts to move, the processing teeth 31 of the first partial bite surface 15 starts the processing of the workpiece W.

When the moving side die 50 moves forward and the workpiece W reaches a first boundary portion 18 that is a boundary portion between the first partial bite surface 15 and the second partial bite surface 16, the screw threads begin to be formed, as shown in FIG. 5.

Furthermore, when the workpiece W reaches a second boundary portion 19 that is a boundary portion between the second partial bite surface 16 and the finishing surface 13, the desired shape of the bolt B is formed nearly fully, as shown in FIG. 6.

Then, the bolt B reaches the roll-off surface 14, and the thread-rolling process is completed.

Here, the moving side die 50 moves at the constant speed of about 900 mm/sec during the period that the workpiece W moves from the thread-rolling starting point 17 to the finishing surface 13. The specific speed can be changed appropriately; however, it is preferable that the speed is maintained constant during the period described above.

Other embodiment is also suggested.

Figure 8A:
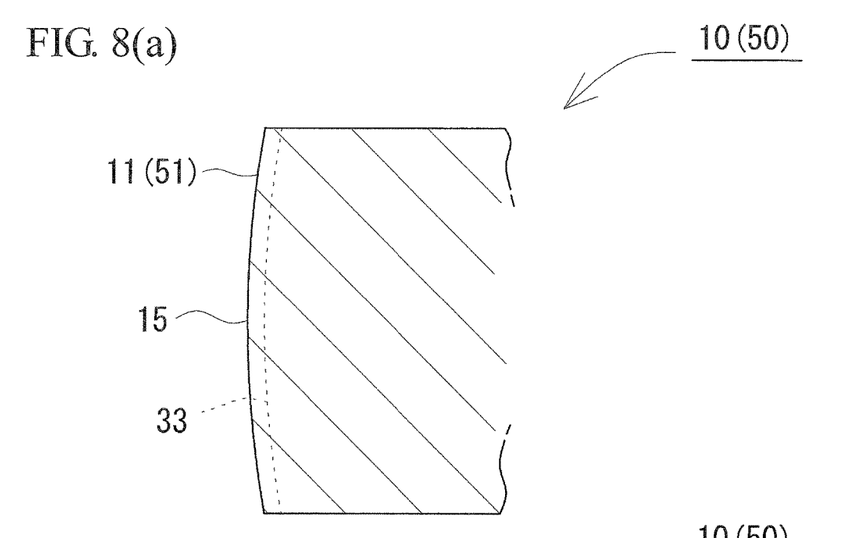
FIG. 8(a) is a brief overview of the cross section of the first partial bite surface of the thread-rolling flat die for a threaded fastener according to another embodiment.
Figure 8B:
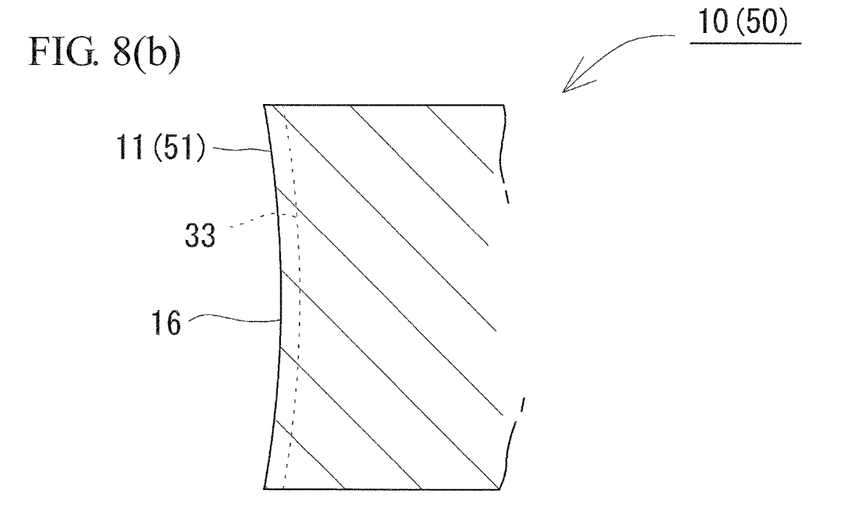
FIG. 8(b) is a brief overview of the cross section of the second partial bite surface of the thread-rolling flat die for a threaded fastener according to another embodiment.

The structure is suggested such that as shown in FIG. 8(a), in the stationary side thread-rolling surface 11 on the stationary side die 10, the first partial bite surface 15 is formed into a convex surface shape that rises toward the moving side thread-rolling surface 51, and that as shown in FIG. 8(b), the second partial bite surface 16 is formed into a concave surface shape that lowers with respect to the moving side thread-rolling surface 51. In other words, the stationary side thread-rolling surface 11 in the first partial bite surface 15 is configured with a convex curved line in which the stationary side thread-rolling surface 11 is formed toward the moving side thread-rolling surface 51 when the cross section of the stationary side die 10 is taken along an imaginary line orthogonal to the thread-rolling direction, and the surface 11 in the second partial bite surface 16 is configured with a concave curved line that recedes toward stationary side die 10. In this case, in the moving side thread-rolling surface 51 on the moving side die 50, the first partial bite surface 15 is formed into the concave surface shape that lowers corresponding to the stationary side thread-rolling surface 11, and the second partial bite surface 16 is formed into the convex surface shape that rises corresponding to the stationary side thread-rolling surface 11.

Similarly, the structure may be made such that in the stationary side thread-rolling surface 11 on the stationary side die 10, the first partial bite surface 15 is formed into the concave surface shape that lowers with respect to the moving side thread-rolling surface 51, and that the second partial bite surface 16 is formed into the convex surface shape that rises toward the moving side thread-rolling surface 51. In this case, in the moving side thread-rolling surface 51 on the moving side die 50, the first partial bite surface 15 is formed into the convex surface shape that rises corresponding to the stationary side thread-rolling surface 11, and the second partial bite surface 16 is formed into the concave surface shape that lowers corresponding to the stationary side thread-rolling surface 11.

The present invention is not limited to the embodiments described above, and the shape of the processing tooth 31 may be continuously changed so as to be formed into the desired shape in the finishing surface 13, for example. For example, the shape can be appropriately changed under conditions where the crest angle of the processing tooth 31 in the bite surface 12 is larger than the crest angle of the processing tooth 31 in the finishing surface 13.

Furthermore, the bite surface 12 may be formed with not only two partial bite surfaces 15, 16, but also three or more partial bite surfaces.

The length L1 of the first partial bite surface 15, the length L2 of the second partial bite surface 16, and the length L3 of the finishing surface 13 preferably have the relationship of L2>L1>L3; however, the relationship may be L2≤L1>L3. The present invention is not intended to actively exclude the configuration of L1>L2>L3.

In addition, the moving speed of the moving side die 50 moving at the constant speed is not limited to the speed described above, and it can be defined appropriately and freely in view of processing conditions such as raw materials and dimensions.

Furthermore, so-called one-way die or two-way die is also applicable.

1 thread-rolling flat die
10 stationary side die
11, 51 thread-rolling surface
12 bite surface
13 finishing surface
15 first partial bite surface
16 second partial bite surface
31 processing tooth
50 moving side die
α inclination angle of first partial bite surface
β inclination angle of second partial bite surface
L1 length of first partial bite surface
L2 length of second partial bite surface
L3 length of finishing surface
θ1-θ3 crest angle
B bolt (threaded fastener)
W workpiece

The invention claimed is:

1. A thread-rolling flat die for a threaded fastener, comprising a thread-rolling surface including at least a bite surface to which a workpiece of the threaded fastener is supplied, a finishing surface formed adjacent to the bite surface, and a roll-off surface formed adjacent to the finishing surface,
   wherein the bite surface includes at least:
      a first partial bite surface having an inclination receding with distance from the finishing surface and an angle α of the inclination with respect to the finishing surface, the first partial bite surface being a portion for substantially forming a thread groove in a processed portion of the workpiece; and
      a second partial bite surface formed continuously from the first partial bite surface and having an inclination receding with distance from the finishing surface and an angle β of the inclination with respect to the finishing surface, the angle β being smaller than the angle α;
   wherein, in the first partial bite surface and the second partial bite surface, a crest angle of a processing tooth for forming a trough bottom of the thread groove in the threaded fastener is larger than a crest angle of a processing tooth in the finishing surface,
   wherein a crest shape of the processing tooth gradually changes from a root side to the crest angle of the processing tooth in the finishing surface along the thread-rolling surface from a starting point of the first partial bite surface toward the finishing surface, and
   wherein a length L1 along a thread-rolling direction in the first partial bite surface, a length L3 along the thread-rolling direction in the finishing surface, a length L4 along the thread-rolling direction in the roll-off surface, and a diameter of the processed portion of the workpiece of the threaded fastener have a relationship of L1>L3>L4> the diameter of the processed portion of the workpiece of the threaded fastener.

2. The thread-rolling flat die for a threaded fastener according to claim 1, wherein the length L1 along the thread-rolling direction in the first partial bite surface, a length L2 along the thread-rolling direction in the second partial bite surface, and the length L3 along the thread-rolling direction in the finishing surface have a relationship of L2>L1>L3.

3. The thread-rolling flat die for a threaded fastener according to claim 1, wherein
   the first partial bite surface has a first edge and a second edge opposite to the first edge in the thread-rolling direction, the first edge being farther away from the finishing surface than the second edge,
   the second partial bite surface has a third edge and a fourth edge opposite to the third edge in the thread-rolling direction, the third edge coincides with the second edge of the first partial bite surface,
   the inclination of the first partial bite surface is constituted by the length along the thread-rolling direction of the first partial bite surface and a first backward amount of the first partial bite surface, the first backward amount corresponding to a first distance, in a direction orthogonal to the finishing surface, between the first edge and a first line extending from the second edge, the first line being parallel to the finishing surface, the inclination of the second partial bite surface is constituted by the length along the thread-rolling direction of the second partial bite surface and a second backward amount of the second partial bite surface, the second backward amount corresponding to a second distance, in a direction orthogonal to the finishing surface, between the third edge and a second line extending from the fourth edge, the second line being parallel to the finishing surface, and the inclination of the second partial bite surface is at least 40% or less of the second backward amount relative to a sum of the first backward amount in the first partial bite surface and the second backward amount in the second partial bite surface.

4. A thread-rolling method, using the thread-rolling flat die for a threaded fastener according to claim 1, wherein a die on a moving side of the thread-rolling flat die for a threaded fastener moves at a constant speed during a period that a workpiece moves from the first partial bite surface to the finishing surface.

* * * * *